United States Patent [19]

Wellinghoff et al.

[11] Patent Number: 4,499,008

[45] Date of Patent: Feb. 12, 1985

[54] METHOD OF MAKING STABLE ELECTRICALLY CONDUCTING POLYMERS

[75] Inventors: Stephen T. Wellinghoff; Samson A. Jenekhe, both of Minneapolis; Thomas J. Kedrowski, St. Paul, all of Minn.

[73] Assignee: Honeywell Inc., Minneapolis, Minn.

[21] Appl. No.: 559,990

[22] Filed: Dec. 9, 1983

Related U.S. Application Data

[62] Division of Ser. No. 420,757, Sep. 21, 1982, Pat. No. 4,452,725.

[51] Int. Cl.³ .............................................. H01B 1/06
[52] U.S. Cl. ..................................... 252/500; 524/80; 524/208; 524/319; 524/358; 524/401; 524/404; 524/422; 528/486; 528/487; 528/490; 528/491; 528/492; 528/493

[58] Field of Search ...................... 252/512, 518, 500; 524/80, 401, 404, 422, 208, 319, 358; 528/423, 486, 487, 490, 491, 492, 493; 427/420, 757, 85, 99

[56] References Cited

U.S. PATENT DOCUMENTS 4,204,216  5/1980  Heeger et al. ......................... 357/8
4,222,903  9/1980  Heeger et al. ...................... 252/518

FOREIGN PATENT DOCUMENTS 56-88422  1/1981  Japan .

*Primary Examiner*—Josephine L. Barr
*Attorney, Agent, or Firm*—Charles G. Mersereau

[57] ABSTRACT

A method of making an electrically conducting polymer is disclosed which includes poly(N-alkyl 3',3 carbazolyl) at least a portion of which is doped with a compatible charge transfer acceptor to provide p-type electrical conductivity, and in which the alkyl group is one selected from the group consisting of ethyl and methyl or a combination thereof.

16 Claims, No Drawings

METHOD OF MAKING STABLE ELECTRICALLY CONDUCTING POLYMERS

This application is a division of application Ser. No. 420,757, filed Sept. 21, 1982, now U.S. Pat. No. 4,452,725.

BACKGROUND OF THE INVENTION

1. Field of the Invention

The present invention relates to highly conductive, environmentally stable organic polymer materials generally and, more particularly, complexes of soluble poly N-methyl 3,3' carbazolyl doped with charge transfer acceptors together with a method of making same.

2. Description of the Prior Art

High molecular weight organic polymer materials are generally non-conductive because they do not have free electrons like metals. It has been found, however, that certain high molecular weight materials having intrinsic double bond structures such as polyacetylene, polythiazine and polypyrrole may become highly conductive when doped with certain impurities. These compounds have proved to be of a great deal of interest inasmuch as they may combine some of the traditional properties of organic polymers such as high strength, light weight, flexibility and low temperature processing together with selective electrical properties including high electrical conductivity. In addition, their cost is relatively low.

Such materials undoubtedly will have an important impact on many areas of technology, especially the electronics industry. For example, experimental batteries made from conducting polymers have been shown to exceed current power sources in both power and energy densitites. Other areas of potential applications include chemical or gas sensors, low cost, large area optical sensors, switches, light weight electrical connections, wire, and in their film form for many types of microelectronic circuits and large area solar cells.

Thus, organic materials that behave as metals or semiconductors will provide the advantages of these materials together with additional advantages of being soluble in organic solvents or having low melting points and glass transition temperatures which both minimize the cost of processing and permit composites to be made with thermally sensitive materials such as doped Si or GaAs, for example. The enormous molecular design flexibility of organic chemistry enables precise tailoring of properties to fill a wide range of applications as enumerated above. In addition, the high strength and conductivity-to-weight ratios lend the advantage of fabrication of many electrical devices of much lower weight than conventional materials.

In the prior art, a large number of polymeric conductors have been made. These include polyacetylene and its analogues which may be doped with $I_2$, $AsF_5$ and $BF_4^-$ or the like. In addition, various phenylene polymers and phthalocyanine complexes have been synthesized as conductive materials.

Highly conducting p-type materials have been obtained by doping the polymer with a charged transfer acceptor such as $I_2$ or $AsF_5$ from the gas or with $ClO_4^-$ or $BF_4^-$ by electrochemical oxidation. An n-type material has been achieved by a doping with alkali metal. In known cases of these two types of materials, however, to date only the p-type show any environmental stability.

Theoretically, conductivity takes place both along the polymer chain and between adjacent chains. The active charge carrier, at least in the aromatic materials, is believed to be a bipolaron that is delocalized over several monomer units. The mobility of such a species along the polymer chain is reduced by conformational disorder, necessitating a rigid highly crystalline chain structure for maximum intrachain conductivity. Various mechanisms such as "hopping" and "interchain exchange" are thought to be responsible for the interchain part of the conductivity. Unfortunately all of the most highly crystalline polymers of high conductivity are insoluble and infusable. Such is the case with the most common prior art conducting polymer, polyacetylene, which because of this, must be used in the same form as polymerized. In film form it becomes highly porous fibrillar networks which are tough, cheap, and can be electrochemically doped very rapidly. Polyacetylene films have been used in lightweight storage batteries and can also be used to make Shottkey barriers which exhibit a photovoltaic effect.

Other slightly less conductive materials include doped poly p-phenylenes; however, poly p-phenylene can be processed only by powder metallurgical techniques, precluding thin film applications. The only two solution processible polymers that are known to have been doped to high conductivities in the prior art, though, are poly m-phenylene and poly m and p-phenylene sulfides. To date, only $AsF_5$ which has a very high electron affinity has been used successfully to generate radical cations in these polymers. Unfortunately, these cations are so unstable that crosslinking and ring fusion reactions occur. This, together with high water sensitivity greatly reduces the utility of the polymers.

Thus, in the prior art, because of the non-processibility of these base polymers, thin films and uniform doping have both been difficult to achieve. One such attempt to remedy this difficulty consisted of co-evaporating biphenyl with $AsF_5$ to simultaneously polymerize the biphenyl and subsequently dope the P-phenylene polymer on the substrate. This procedure has also been used with several aromatic and heteroaromatic monomers capable of undergoing Lewis acid induced oxidative polymerization with an active radical cation chain end. Invariably black insoluble films of somewhat undetermined composition have resulted. Conductivities as high as $10^{-2}$/ohm-cm were reached, however. This process for generating thin films is somewhat similar to the solid state polymerization of evaporated $S_2N_2$ thin films to a semiconducting $(SN)_x$ of rather low environmental stability.

The most uniformly doped and environmentally stable prior art conducting polymers have been electrochemically synthesized and simultaneously doped polypyrrole type films which show conductivities as high as $10^2$/ohm-cm, and are stable indefinitely in air. Unfortunately, these films also are brittle and of somewhat indefinite composition.

Thus, to summarize, almost all of the conducting polymers obtained in the prior art are unstable, even at room temperature, and are usually insoluble and infusible or have other drawbacks. The most common conducting polymer, polyacetylene, is insoluble and infusible and unstable at room temperature in air. The most uniformly doped and environmentally stable conducting polymers of the prior art, electrochemically synthesized and simultaneously doped polypyrrole type films, while stable indefinitely in air at room temperature, are brittle and of very limited use. While certain polyphenylene compounds are solution processable, when doped, crosslinking and ring fusion reactions occur and the compounds are highly sensitive to the presence of water such as that in the atmosphere.

Therefore, there remains a definite need for an environmentally stable, solution and/or melt processable adaptive polymers which also have the desired physical properties and which are compatible with conventional fabrication for such applications as thin film technology.

One additional compound, structurally somewhat similar to the base polymer of the present invention, namely, poly(n alkyl-3,6 carbazolyl) has been described in Japanese Pat. No. 81 88,422 issued to Asahi Glass Company, Ltd. That reference discloses a N-ethylated 3,3′ carbazolyl polymer which is useful as a photoconductor. These are relatively low molecular weight materials with a number average molecular weight ($\overline{Mn}$) of 1000–1200 prepared by Grignard polymerication of 9-alkyl-3,6-dihalocarbazoles in the presence of a transition metal catalyst in tetrahydrofuran (THF). The polymers were not doped nor credited with any particular electrical conductivity properties.

SUMMARY OF THE INVENTION

By means of the present invention many of the problems and drawbacks associated with prior art electrically conductive polymers have been solved by the provision of a conductive polymer having a combination of desirable attributes. In accordance with the invention, relatively high molecular weight polymers of N-alkyl 3,3′ carbazolyl

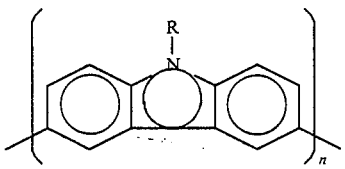

wherein R is a methyl or ethyl group have been discovered to be soluble in organic solvents, non-brittle, ductile, environmentally stable and one in which environmentally stable radical cations can be formed by doping with acceptors much lower in election affinity than $AsF_5$ and which exhibits high electrical conductivities such as polypyrrole when chemically doped with such charge transfer acceptor dopants halogens such as iodine ($I_2$) and bromine ($Br_2$), $NO+BF_4^-$, protic acids, tetracyano, quino dimethane (TCNQ), dichloro dicyano quinone (DDQ) and chloranil. Moreover, doping does not affect the desirable qualities.

The preferred alkyl group is methyl. The polymers have been observed to maintain chemical and electrical stability even in moist air for an extended period of time. The polymers can be cast from a solution of organic solvent and even the doped polymer can be melted, and recast, or hot worked, i.e., drawn into wires or otherwise shaped with detrimental effects to the desired properties.

In the preferred method of making the preferred polymer of the invention, the monomer N-methyl 3,3′ dibromocarbazole is used. The di-Grignard reagent of the monomer is prepared using K metal to precipitate finely divided active Mg metal from a suspension of $MgCl_2$ and KI in refluxing tetrahydrofuran (THF) in a nitrogen atmosphere. The Grignard reagent preferrably includes a portion but not all of the monomer. To this solution, a small amount of anhydrous powdered $NiBr_2(PPh_3)_2$ catalyst and the remainder of the monomer dissolved in THF are added again in a nitrogen atmosphere. The resultant suspension is refluxed under nitrogen until a precipitate is formed. The reaction mixture is then quenched into dilute HCl, washed thoroughly with water and dried to a powder or may be cast into a film from a solution of nitrobenene.

While others can be used successfully, the preferred dopant is $I_2$. Doping may be accomplished by a variety of methods. These include exposing the powder or other form to vapor containing the dopant. Or the material may be doped in a film form by casting the prepared polymer from an organic solvent such as nitrobenzene, or melt casting the polymer on a substrate such as ceramic alumina ($Al_2O_3$), metallic aluminum or glass and contacting the film with a solution of a dopant such as $I_2$ in methanol. In addition, fibers can be drawn into forms like wires and doped by solution or vapor phase contact with suitable dopants. It is also contemplated that doping by ion implantation may be accomplished.

DESCRIPTION OF THE PREFERRED EMBODIMENT

I. Polymer Preparation

Example 1

One synthesis of high molecular weight poly(N-methyl-3,3′-carbazole) was as follows:

A. Reactants

The reactants used were as follows:

|  | g | moles |
|---|---|---|
| N—Methyl-3,3′-dibromocarbazole<br>F.W. 339.03 g/m<br>M.P. 158–160° C.<br>Color: White | 20.2 | 0.0590 |
| Magnesium Chloride (Anhydrous) ($MgCl_2$)<br>F.W. 95.22 g/m<br>Color: White | 5.62 | 0.05902 |
| Potassium (metal sticks) (K)<br>F.W. 39.098<br>Color: Blue | 4.613 | 0.1180 |
| Potassium Iodide (KI)<br>F.W. 166.01<br>Color: White | 9.79 | 0.0590 |
| Molar Ratios<br>$MgCl_2/C_{13}H_9NBr_2 = 1.0$<br>$K/MgCl_2 = 2.0$<br>$KI/C_{13}H_9NBr_2 = 1.0$ | | |

B. Synthesis Procedure
(Time is given in minutes unless otherwise indicated.)

| Time (Minutes) | Steps |
|---|---|
| 0 | (1) 100 ml of dry tetrahydrofuran (THF) was pumped into a 3-neck, round bottom reaction flask equipped with a magnetic stirrer, heating mantle, reflux condenser and addition funnel. The apparatus which was previously thoroughly dried in an oven was continuously purged with nitrogen gas.<br>(2) The potassium metal was added, the heating mantle and reflux condenser were turned on and the magnetic stirring started. |
| 5 | (3) The potassium iodide (KI) was added. This was followed immediately by the addition |

| Time (Minutes) | Steps |
|---|---|
| | of the magnesium chloride (MgCl$_2$). The temperature was controlled at 65° C. |
| 30 | A color change from white to gray to black began to be noticeable at about the 30 minute mark. |
| 120 | (4) 10 g of N—Methyl-3,3'-dibromocarbazole (DBMC) monomer was dissolved in 125 mls of THF which had previously been pumped into the addition funnel. The addition funnel was shaken to insure complete dissolution of the (DBMC). A complete color change of solution to black had occurred prior to the addition of the monomer. |
| 121 | (5) The solution of DBMC in THF was added dropwise over a 15 minute period until addition was complete. |
| 160 | The color of solution remained black as the Grignard reagent was formed. |
| 220 | (6) The color remained black and the remaining 10 g of DBMC monomer were dissolved in an additional 125 ml of THF.NiBr$_2$(PPh$_3$)$_2$ was added to the monomer - THF solution (approximately - 0.03 g). This solution was then added dropwise to the reaction vessel containing the Grignard reagent through the use of the addition funnel. |
| 72 hours (3 days) | (7) The polymerization was allowed to proceed at 65° C. The reaction was stopped and the solution poured into an HCL and water solution. After washing with water to remove salts, a yellowish powder was obtained. The polymer yield was 9.01 g or 92.5% of the 9.735 g theoretical yield. |

II. Polymer Characterization

While the number average molecular weight $\overline{M}n$ has not been precisely determined, it is probably well over 15,000 based on observed mechanical properties, including ductility, lack of brittleness, etc. This represents a significant increase (at least one order of magnitude) over prior methods of synthesis in which the entire amount of monomer was converted into the Grignard prior to polymerization.

Although the N to C ratio expected for the polymer was obtained in the elemental analysis, some unreacted Br end groups were still present in the polymer. Besides the C—H out of plane vibrations at 800 cm-1 and 860 cm-1 which were characteristic of 1, 2, 4 trisubstitution, weaker C—H out of plane vibrations for unsubstituted carbazole end groups formed by hydrolysis of active Grignard end groups were also seen in the IR spectrum of the polymer. The doublet nature of the 860 cm-1 peak probably originate from both 3' bromo and 3' carbazolyl substitution.

Thermogravimetric analysis (TGA) of the polymer indicated that thermal degradation starts at about 300° C. with a small loss of absorbed water below that temperature. The total weight loss observed was only 10% at 700° C. in N$_2$. IR analysis showed that low molecular weight material with unsubstituted ends is lost by heating in N$_2$ at 300° C. There is also preliminary indication that higher molecular weights are lost at 400° C. From this, high temperature annealing appears to be a good way to increase the average molecular weight of the polymer still further.

The polymer can be dissolved in acceptor type solvents such as nitrobenzene, 2,4 dinitrochlorobenzene, and 2,4 dinitrofluorobenzene in high enough concentrations to cast clear yellowish films at 50°-100° C. Protic solvents such as concentrated sulfuric acid and trichloracetic acid-nitrobenzene form stable deep green solutions with the polymer at room temperature, a phenomenon typical of carbazolyl radical cation. Heating above 160° C. caused the radical cation to decompose generating a deep blue solution from which blue films could be cast.

C. Complex—Formation

Films of the polymer were exposed to I$_2$ vapor at 50° C. for 1 hr. to yield black shining films. Powders of the polymer were also doped under the same conditions to produce a complex with one iodine atom per carbazole monomer unit.

As an alternative, films of the polymer were cast from nitrobenzene onto substrates of ceramic alumina or metallic aluminum or glass. These were subsequently dipped into a methanol solution of I$_2$ at 25° C. for 1 hr. to achieve doping.

Also films were made by melt processing. A suitable substrate was placed on a hot plate and the polymer was heated above the softening temperature (Tg) or about 100° C. Subsequently, vapor phase or solution doping was achieved as above. In addition doping may be accomplished by dissolving the polymer in a suitable solvent such as nitrobenzene containing an amount of the dopant and casting or precipitating the doped polymer from the solution. In this manner the degree of doping can be closely controlled. It is also believed that certain dopants such as halogen dopants may be added by ion implantation.

All the Br end groups disappeared upon doping, a phenomenon seen before as halogen elimination upon carbazolyl radical ion formation. In the case of 3,3' diiodo N-substituted carbazole, dimerization to the bicarbazolyl is found. While it has not been proved, the doping could also be responsible for increasing the molecular weight of the final polymer form.

It should be noted that lower molecular weight films prepared entirely from reaction of the Grignard reagent were quite brittle and had a definite tendency to crack before and after halogen doping. The higher molecular weight polymers, however, showed no degradation of desirable mechanical properties upon doping.

The absorbance spectrum of the doped film was intense and featureless from 0.3 to 25 microns reminiscent of a semiconductor containing localized states within the band gap. Indeed the electrical conductivity was thermally activated with an activation energy of only 0.04 eV typical of amorphous semiconductors which are suspected of having this type of band structure. The D.C. pressed pellet conductivity (4 pt. probe) was always in the vicinity 0.1/ohms-cm at 25° C. Significantly, this did not change after exposure to room air for nearly two months.

X-ray scattering peaks at 3.08 A and 5.92 A were visible in the doped specimen. The larger d-spacing is seen also in the undoped polymer which is partially crystalline. The smaller spacing, which is not prominent in the undoped material could be due to the spacing between overlying aromatic rings from adjacent chains. If this be true, significant interchain orbital overlap would occur, explaining the high conductivity in the presence of a large amount of intrachain conformational disorder.

It has also been observed that it is possible to complex the polymer of TCNQ and substituted quinones by dissolving both acceptor and donor in 2,4 dinitrofluorobenzene and casting films which range from green to black in color.

Thus, by means of the present invention a solution and melt processable polymer of high environmental and thermal stability has been made. The film can be doped without affecting the desired properties. In addition the doped film can be melt processed into films. The polymer has been employed to make continuous films which can be doped to very high conductivities to 1-20/ohm-cm with a mild oxidizing agent ($I_2$) at low temperatures (50° C.). Recently wires have been drawn from quantitites of the polymer at temperature below 110° C. and doped to high conductivity without affecting the mechanical properties. This property has not been observed in previous compounds.

The embodiments of the invention in which an exclusive property or right is claimed are defined as follows:

1. A method of making an electrically conducting polymer comprising the steps of:
   preparing a first liquid solution comprising a Grignard reagent of a quantity of monomer selected from the group consisting of N-methyl-3',3 dibromocarbazole and N-ethyl-3',3 dibromocarbazole or a combination thereof;
   preparing a second liquid solution of the remainder of the monomer;
   polymerizing a mixture of said first and said second solution in the presence of a suitable catalyst in an atmosphere inert to the reactants and products for sufficient time to produce a high molecular weight polymer;
   recovering said polymer; and
   complexing said polymer with a compatible charge transfer acceptor dopant wherein said charge transfer acceptor is selected from the group consisting of $I_2$, $Br_2$, $Cl_2$, $F_2$, TCNQ, DDQ, $NO^+BF_4^-$, chloranil and protic acids selected from the group consisting of HI, HBr HCl, HF, $H_2SO_4$, $HClO_4$, and $CCl_3COOH$, or a combination thereof.

2. The method according to claim 1 wherein said polymer is polymerized to a sufficient molecular weight to render it non-brittle and allow melt casting and extrusion.

3. The method according to claim 2 including the step of casting a film of said polymer from a suitable solvent or from the molten state onto a substrate prior to complexing.

4. The method according to either of claims 1 or 2 wherein said alkyl group is methyl.

5. The method according to either of claims 1 or 2 wherein said dopant is $I_2$.

6. The method according to claim 3 wherein said dopant is $I_2$.

7. The method according to claim 3 wherein said doping is accomplished by dipping said film in a solution of said dopant.

8. The method according to either one of claims 3 or 7 wherein said alkyl group is methyl.

9. The method according to either one of claims 3 or 7 wherein said dopant is $I_2$.

10. The method according to either of claims 1 or 2 wherein said first and said second solutions each comprise approximately one half of the monomer.

11. The method according to either of claims 1 or 2 wherein said step of recovering said polymer comprises precipitating said polymer from a non-solvent.

12. The method according to, either one of claims 1 or 2 wherein said complexing step includes dissolving said polymer in a solvent therefor containing an amount of said dopant and casting the doped resultant into a desired form.

13. The method according to claim 12 wherein said dopant is $I_2$.

14. The method according to either one of claims 1 or 2 wherein said complexing step includes exposing said polymer to a vapor containing said dopant.

15. The method according to claim 14 wherein said dopant is $I_2$.

16. The method according to claim 11 wherein said complexing step includes dissolving said polymer in a solvent therefor containing an amount of said dopant and casting the complexed resultant into a desired form.

* * * * *